United States Patent
Leather et al.

(10) Patent No.: US 6,664,958 B1
(45) Date of Patent: Dec. 16, 2003

(54) Z-TEXTURING

(75) Inventors: Mark M. Leather, Saratoga, CA (US); Anthony P. DeLaurier, Sunnyvale, CA (US); Patrick Y. Law, Milpitas, CA (US); Robert A. Drebin, Palo Alto, CA (US); Howard Cheng, Sammamish, WA (US); Robert Moore, Heathrow, FL (US)

(73) Assignee: Nintendo Co., Ltd., Kyoto (JP)

( * ) Notice: Subject to any disclaimer, the term of this patent is extended or adjusted under 35 U.S.C. 154(b) by 178 days.

(21) Appl. No.: 09/722,378

(22) Filed: Nov. 28, 2000

Related U.S. Application Data

(60) Provisional application No. 60/226,913, filed on Aug. 23, 2000.

(51) Int. Cl.[7] .............................................. G06T 15/40
(52) U.S. Cl. ...................... 345/422; 345/421; 345/428; 345/581; 345/582; 345/587
(58) Field of Search ................................ 345/419, 581, 345/582, 421, 422, 587, 506, 589, 606, 427, 428, 552

(56) References Cited

U.S. PATENT DOCUMENTS

| | | |
|---|---|---|
| 4,388,620 A | 6/1983 | Sherman |
| 4,425,559 A | 1/1984 | Sherman |
| 4,570,233 A | 2/1986 | Yan et al. |
| 4,658,247 A | 4/1987 | Gharachorloo |
| 4,725,831 A | 2/1988 | Coleman |
| 4,829,295 A | 5/1989 | Hiroyuki |
| 4,855,934 A | 8/1989 | Robinson |
| 4,862,392 A | 8/1989 | Steiner |
| 4,866,637 A | 9/1989 | Gonzalez-Lopez et al. |
| 4,901,064 A | 2/1990 | Deering |
| 4,914,729 A | 4/1990 | Omori et al. |
| 4,945,500 A | 7/1990 | Deering |
| 5,136,664 A | 8/1992 | Bersack et al. |
| 5,170,468 A | 12/1992 | Shah et al. |
| 5,392,385 A | 2/1995 | Evangelisti et al. |
| 5,392,393 A | 2/1995 | Deering |
| 5,421,028 A | 5/1995 | Swanson |

(List continued on next page.)

FOREIGN PATENT DOCUMENTS

| | | |
|---|---|---|
| CA | 2070934 | 12/1993 |
| EP | 1 074 945 | 2/2001 |
| EP | 1 075 146 | 2/2001 |

(List continued on next page.)

OTHER PUBLICATIONS

Shade, Jonathan et al., "Layered Depth Images," *Computer Graphics Proceedings*, Annnual Conference Series, pp. 231–242 (1998).

(List continued on next page.)

*Primary Examiner*—Mark Zimmerman
*Assistant Examiner*—Kimbinh T. Nguyen
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. The same texture mapping hardware used for color texturing provides resampled z texturing for sprites with depth or other applications. A z blender performs a z blending operation in screen space to blend surface z values with z texel values to provide per-pixel mapping of resampled z textures onto sampled 3D surface locations. Z texels can represent absolute depths or depth displacements relative to primitive surface depth. The z texel values may add to or replace primitive surface z values, and a constant bias may be added if desired. The resulting depth values are used for occlusion testing. Z textures can be generated by copying out portions of an embedded z buffer and providing the copied depth values to the texture mapping hardware. Multiple z texel formats are supported.

17 Claims, 17 Drawing Sheets

EXAMPLE Z TEXTURING

U.S. PATENT DOCUMENTS

| | | |
|---|---|---|
| 5,457,775 A | 10/1995 | Johnson, Jr. et al. |
| 5,504,917 A | 4/1996 | Austin |
| 5,594,854 A | 1/1997 | Baldwin et al. |
| 5,608,424 A | 3/1997 | Takahashi et al. |
| 5,687,357 A | 11/1997 | Priem |
| 5,701,444 A | 12/1997 | Baldwin |
| 5,721,947 A | 2/1998 | Priem et al. |
| 5,727,192 A | 3/1998 | Baldwin |
| 5,751,291 A | 5/1998 | Olsen et al. |
| 5,758,182 A | 5/1998 | Rosenthal et al. |
| 5,764,243 A | 6/1998 | Baldwin |
| 5,768,626 A | 6/1998 | Munson et al. |
| 5,768,629 A | 6/1998 | Wise et al. |
| 5,774,133 A | 6/1998 | Neave et al. |
| 5,777,629 A | 7/1998 | Baldwin |
| 5,798,770 A | 8/1998 | Baldwin |
| 5,801,706 A | 9/1998 | Fujita et al. |
| 5,801,716 A | 9/1998 | Silverbrook |
| 5,805,868 A | 9/1998 | Murphy |
| 5,815,166 A | 9/1998 | Baldwin |
| 5,821,949 A | 10/1998 | Deering |
| 5,856,829 A | 1/1999 | Gray, III et al. |
| 5,870,097 A | 2/1999 | Snyder et al. |
| 5,874,969 A | 2/1999 | Storm et al. |
| 5,914,721 A | 6/1999 | Lim |
| 5,917,496 A | 6/1999 | Fujita et al. |
| 5,920,326 A | 7/1999 | Rentschler et al. |
| 5,940,086 A | 8/1999 | Rentschler et al. |
| 5,949,423 A | 9/1999 | Olsen |
| 5,949,424 A | 9/1999 | Cabral et al. |
| 5,949,440 A | 9/1999 | Krech, Jr. et al. |
| 5,969,726 A | 10/1999 | Rentschler et al. |
| 5,977,979 A | 11/1999 | Clough et al. |
| 5,999,196 A | 12/1999 | Storm et al. |
| 6,002,409 A | 12/1999 | Harkin |
| 6,023,738 A | 2/2000 | Priem et al. |
| 6,025,853 A | 2/2000 | Baldwin |
| 6,028,611 A | 2/2000 | Anderson et al. |
| 6,037,948 A | 3/2000 | Liepa |
| 6,037,949 A | 3/2000 | DeRose et al. |
| 6,057,847 A | 5/2000 | Jenkins |
| 6,057,852 A | 5/2000 | Krech, Jr. |
| 6,088,035 A | 7/2000 | Sudarsky et al. |
| 6,092,124 A | 7/2000 | Priem et al. |
| 6,094,200 A | 7/2000 | Olsen et al. |
| 6,111,582 A | 8/2000 | Jenkins |
| 6,115,049 A * | 9/2000 | Winner et al. ............. 345/611 |
| 6,173,367 B1 | 1/2001 | Aleksic et al. |
| 6,181,352 B1 | 1/2001 | Kirk et al. |
| 6,198,488 B1 | 3/2001 | Lindholm et al. |
| 6,215,496 B1 * | 4/2001 | Szeliski et al. ............. 345/419 |
| 6,226,012 B1 | 5/2001 | Priem et al. |
| 6,342,892 B1 * | 1/2002 | Van Hook et al. .......... 345/503 |

FOREIGN PATENT DOCUMENTS

| | | |
|---|---|---|
| EP | 1 081 649 | 3/2001 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO 94/10641 | 5/1994 |

OTHER PUBLICATIONS

Photograph of Sony PlayStation II System.

Photograph of Sega Dreamcast System.

Photograph of Nintendo 64 System.

Whitepaper: 3D Graphics Demystified, Nov. 11, 1999, www.nvidia.com.

Whitepaper: "Z Buffering, Interpolation and More W–Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic Texture Filtering In OpenGL, posted Jul. 17, 2000, www.nvidia.com.

Whitpaper: Mapping Texels to Pixels in D3D, posted Apr. 5, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper:Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in DirectX6", Game Developer, Sep. 1998, www.gdmag.com.

Vision Tek, "GeForce2 GS Graphics Processing Unit", ©2000 www.visiontek.com.

Jim Bushnell et al. "Advanced Mutlitexture Effects With Direct3D and Open GL", Pyramid Peak Design & ATI Research, Inc., GameDevelopers Conference, ©1999.

Sony PlayStation II Instruction Manual, Sony Computer Entertainment Inc., ©2000.

Stand and Be Judged, Next Generation, May 2000.

PlayStation II: Hardware Heaven or Hell?, Next Generation, Jan. 2000.

Chris Charla, "Play Station II: The Latest News", Next Generation, Sep. 1999.

"First PlayStation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.

Inside Sony's Next Generation Playstation, ©1999.

Press Releases, Mar. 18, 1999.

Chris Johnston, "PlayStation Part Deux", Press Start, ©1999.

Nikkei Shimbun, "Sony Making SME, Chemical and SPT into Wholly–Owned Subsidiaries", Mar. 9, 1999.

AM News: Japanese Developers Not All Sold on PS2, Next Generation, Mar. 16, 1999.

Sony To Turn PlaySation Maker Into Wholly Owned Unit–Nikkei, Dow Jones News Service, Mar. 8, 1999.

Yumiko Ono, Sony Antes Up Its Chips In Bet On New Game System, Dow Jones News Service, Mar. 4, 1999.

MacWeek.Com Gets Inside Story on Connectix VGS for Windows; Controversial Emulator of Sony PlayStation Games Cureently Available for Macs Only, Business Wire, Mar. 12, 1999.

"DexDrive Bridges Gap", The Tampa Tribune, Mar. 12, 1999.

A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.

Dreamcast Instruction Manual, Sega Enterprises, Ltd., ©1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Ever Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStation II", Newsweek, Mar. 6, 2000.

David Sheff, "Sony Smackage: Test Driving The PlayStation II", Wired, Nov. 1999.

Introducing The Next Generation PlayStation, Sony Computer Entertainment Inc., ©1999.

Leadtek GTS, Aug. 3, 2000, www.hexus.net.

Voodoo 5 5500 Review, Jul. 26, 2000, www.hexus.net.

ATI Radeon 64 Meg DDR OEM, Aug., 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second–Depth Shadow Mapping", Department of Computer Science, Univ. N.C, Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov., 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994,pp. 433–437.

James F. Blinn, "Simulationof Wrinkled Surfaces," Caltech/JPL, pp. 286–292, SIGGRAPH 78 (1978).

Tomas Möller and Eric Haines "Real–Time Rendering", AK Peters, Ltd., ©1999, pp. 127–142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump–mapping Choices and Concepts, Jun. 07, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000,www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per–Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvdia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999 www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1989.

The RenderMan Interface, Version 3.2, Pixas Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, 2/99, www.game–revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer's Reference, Microsoft Corporation,1995–1999 (as part of the DirectX 7.0 SDK on the Companion CD Include with "Inside Direct 3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addision–Wesley Publishing Co., 1993.

"Procedural Elements for Computer Graphics," Second Edition, David F. Rogers, McGraw Hill, 1998.

"Real–Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

* cited by examiner

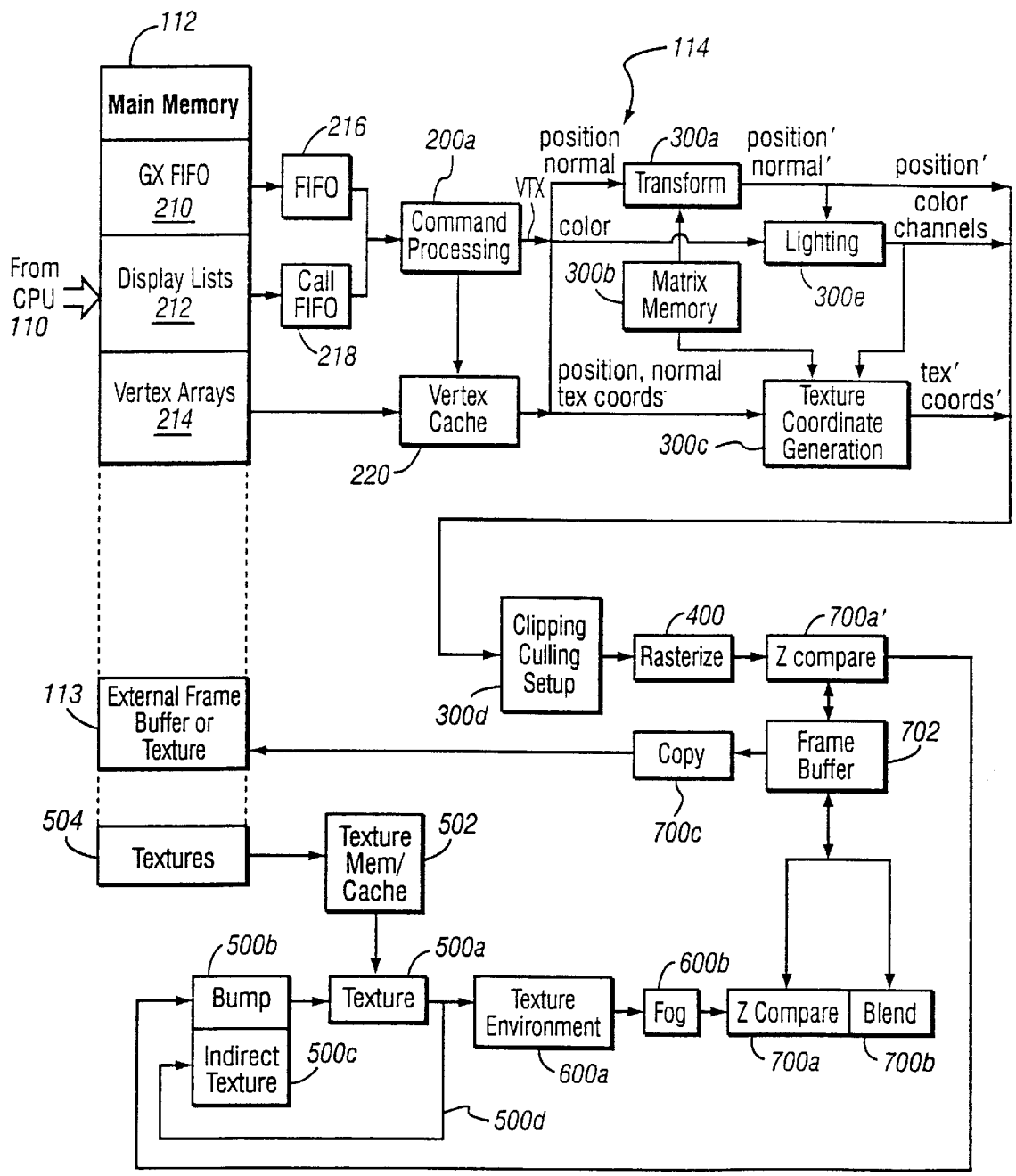
Fig. 5 EXAMPLE GRAPHICS PROCESSOR FLOW

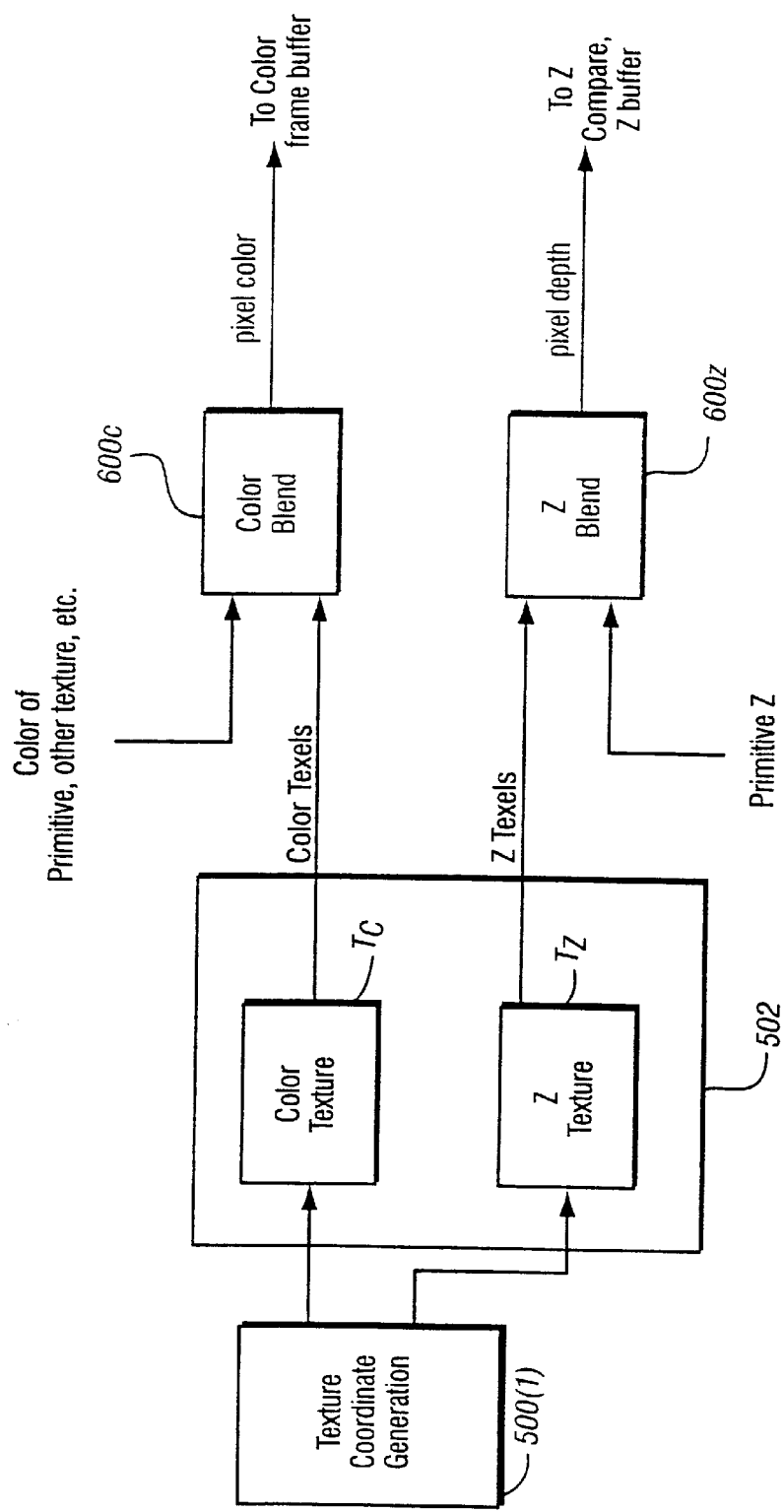
Fig. 6 EXAMPLE Z TEXTURING

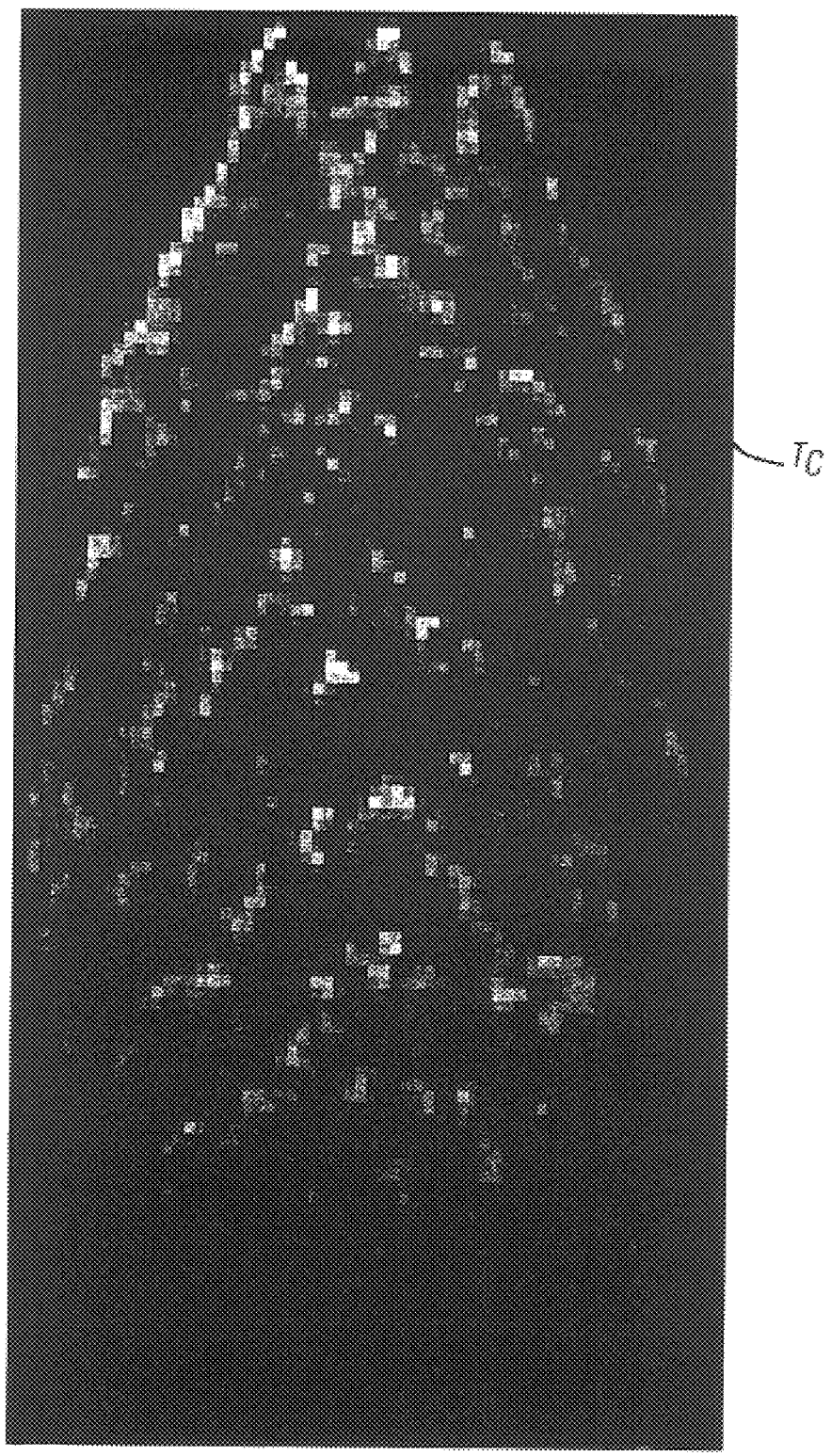
Fig. 7A EXAMPLE COLOR TEXTURE

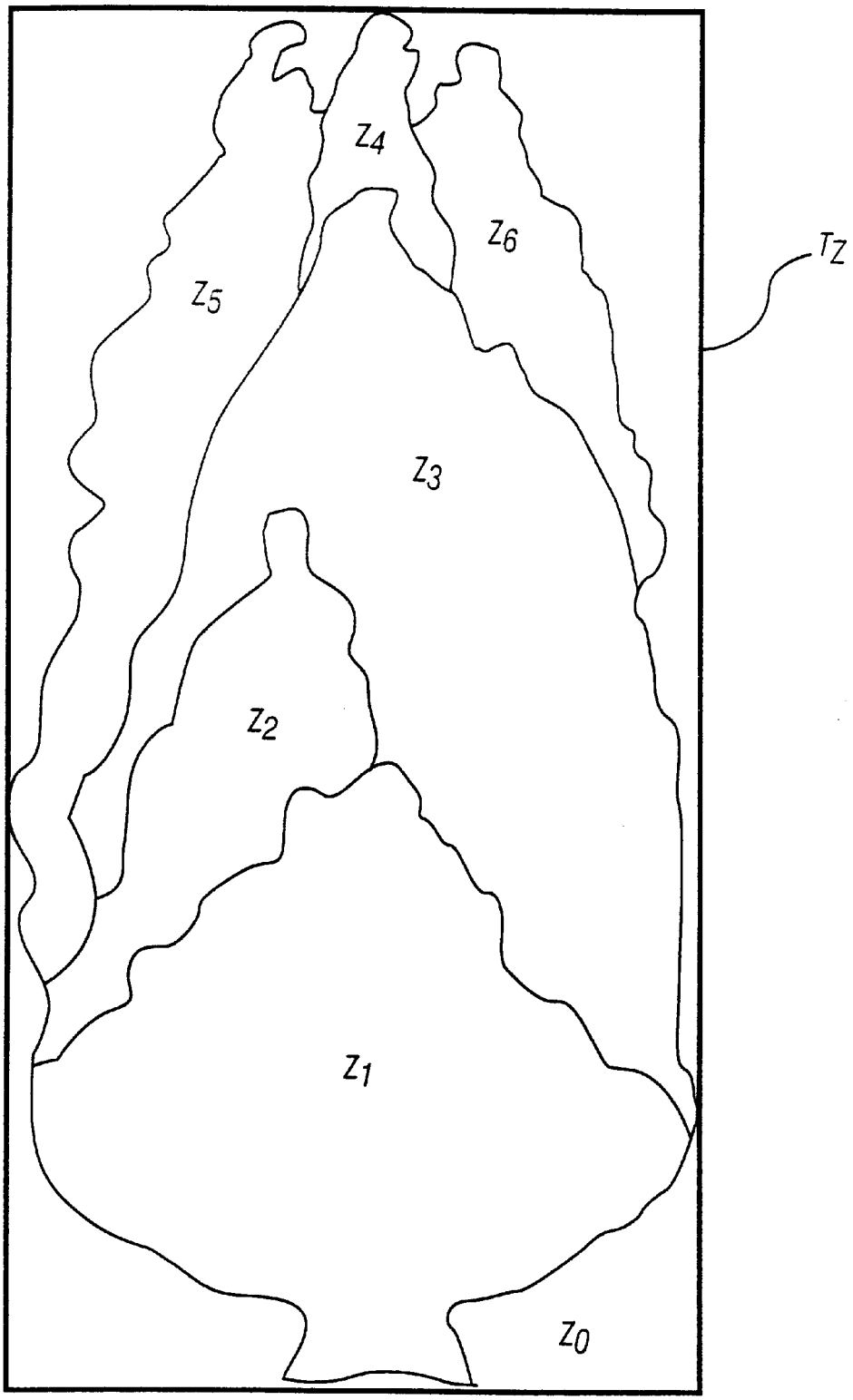
Fig. 7B    EXAMPLE Z TEXTURE

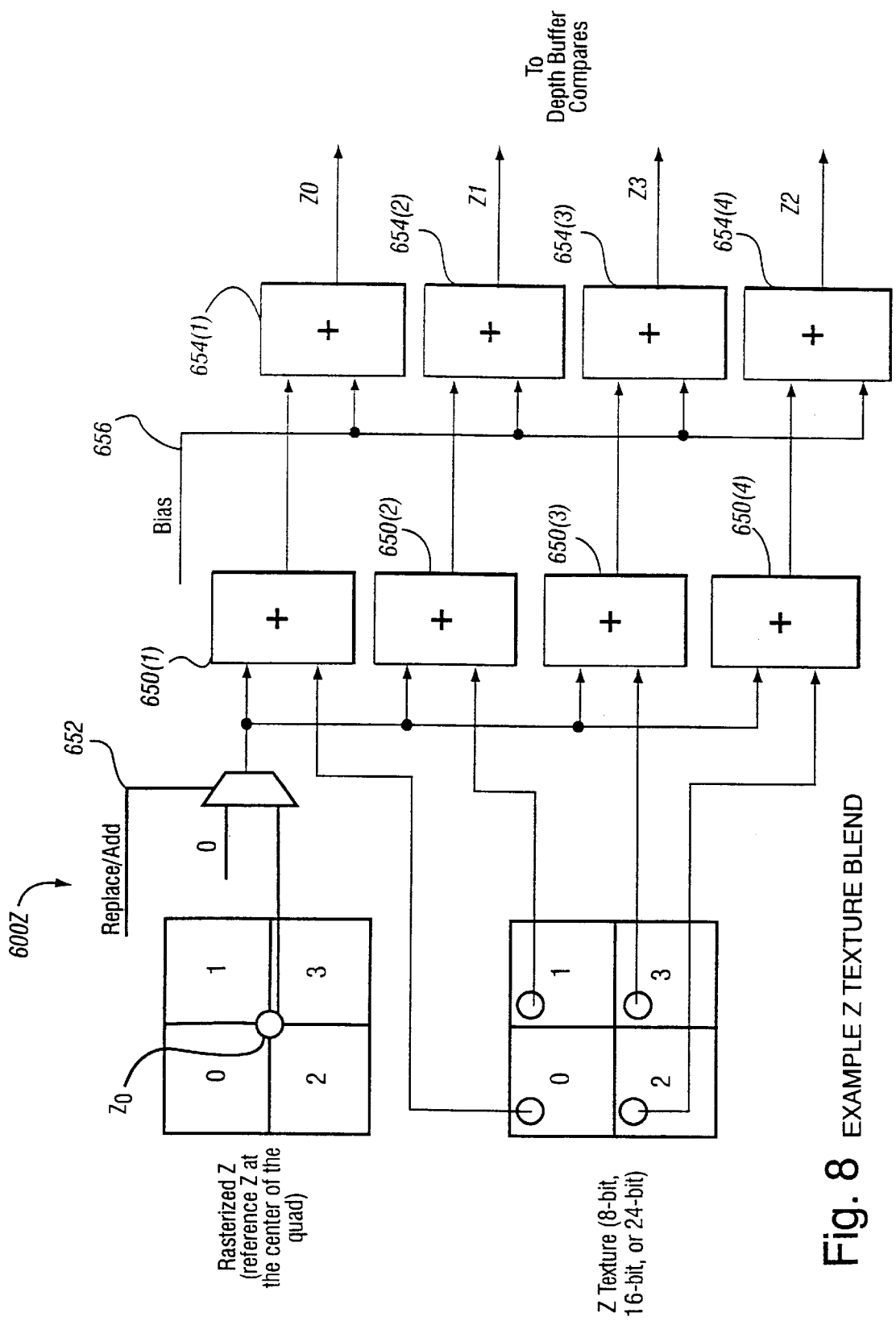
Fig. 8  EXAMPLE Z TEXTURE BLEND

Fig. 9A
8-bit Z
(I8)
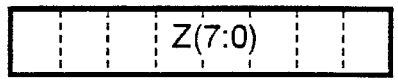
Fig. 9B
16-bit Z
(IA8)
Fig. 9C
24-bit Z
(RGBA8)
EXAMPLE Z TEXEL FORMATS

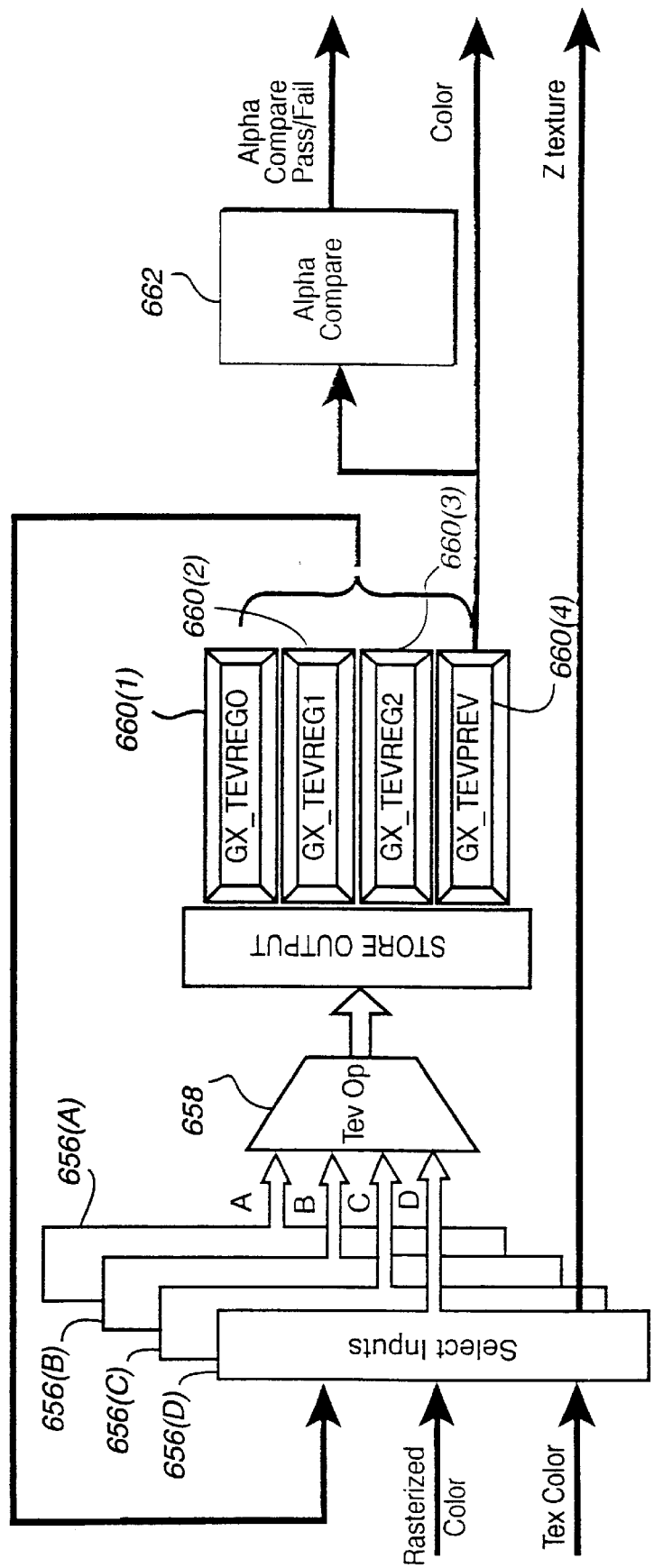
Fig. 10 TEV BLOCK DIAGRAM

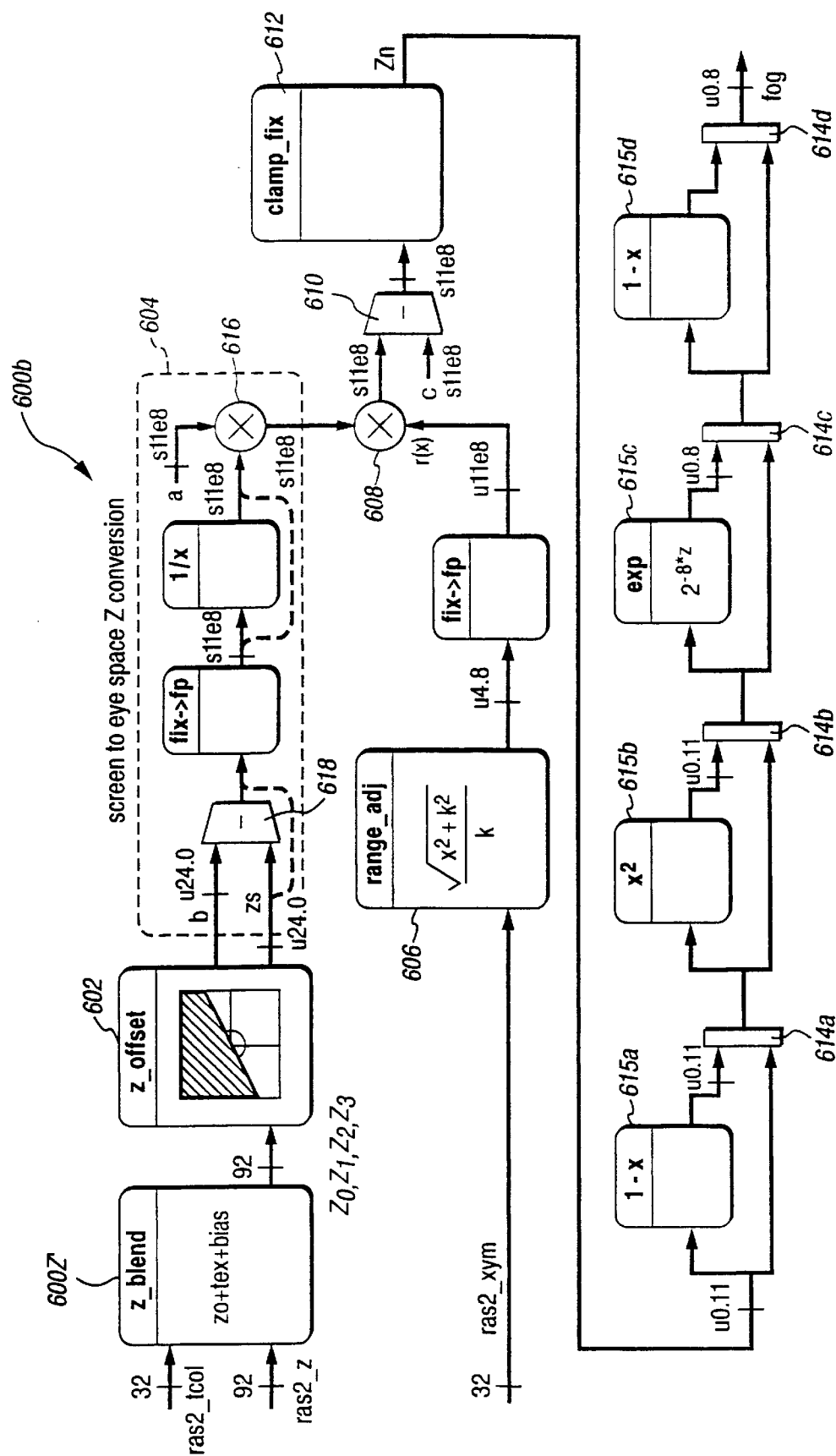
Fig. 11 EXAMPLE TEV FOG CALCULATION UNIT

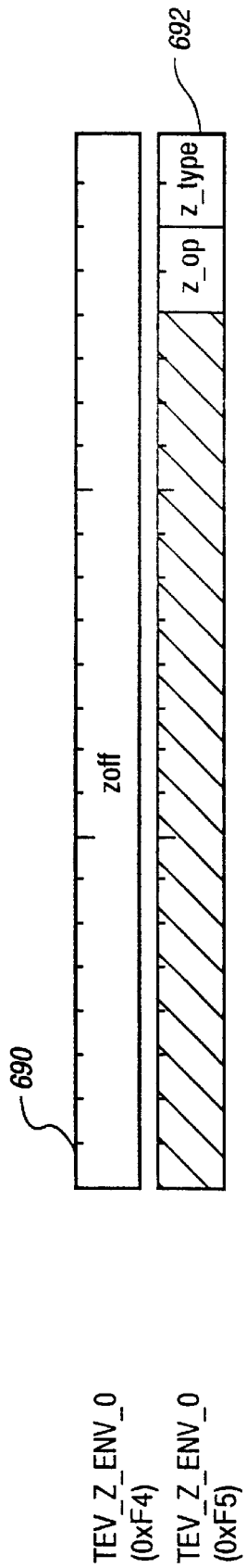
Fig. 12 EXAMPLE Z TEXTURE CONTROL REGISTERS

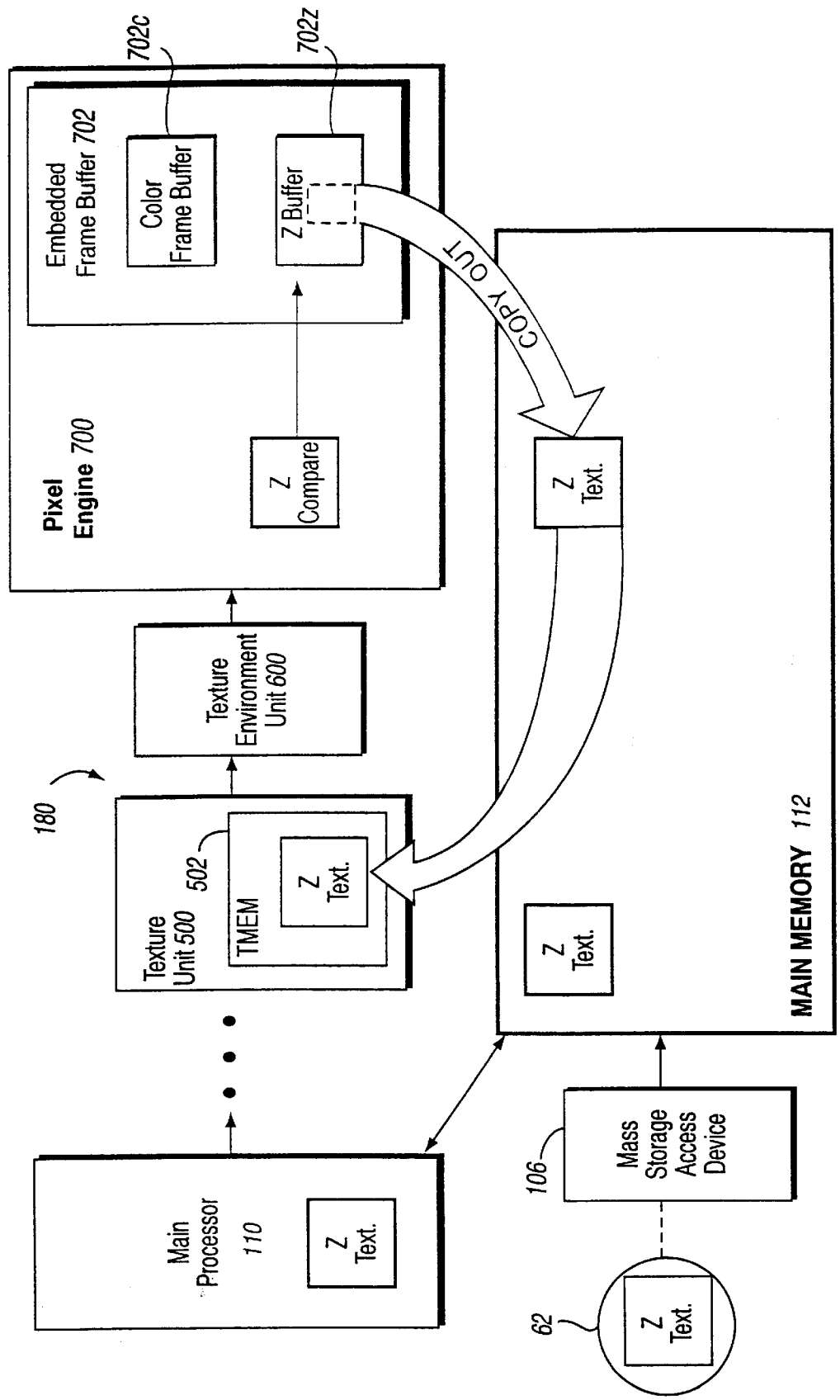
Fig. 13    EXAMPLE Z TEXTURE SOURCING (COPY PIPELINE)

Z-TEXTURING

This application claims the benefit of U.S. Provisional Application No. 60/226,913, filed Aug. 23, 2000, the entire content of which is hereby incorporated by reference in this application.

FIELD OF THE INVENTION

The present invention relates to computer graphics, and more particularly to interactive graphics systems such as home video game platforms. Still more particularly this invention relates to the use of two-dimensional z texture depth maps for increasing occlusion visualization complexity of a scene.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

For many years, problem graphics system designers have confronted the problem of increasing the visual complexity of a scene without incurring the cost of modeling all aspects of the increased complexity using 3D geometry. Various solutions to this problem were offered. As one example, computer graphics has long been used to display images of molecular models (e.g., the hundreds or thousands of molecules in a complex chemical compound structure). Such molecular modeling requires the different parts (e.g., molecules) within the molecular models to be assigned to different depths. To avoid the computational complexities associated with polygon modeling of many hundreds or thousands of spheres that make up a complex molecular model, one technique used in the early 1980's was to define each different molecule in the model as a 2D "sprite" (e.g., bit mapped color picture). A planar depth image (e.g., "depth sprite" of constant depth) was associated with each color sprite. To render the molecular model, so-called "blit" operations were used to copy the various color sprites into appropriate locations within the color frame buffer, and to copy the associated depth sprites into appropriate locations of the depth (z) buffer. In one example arrangement, the "z-blit" operator typically added the depth image as an offset to a base depth value in the z buffer using a one-to-one copy in the plane of the "blit." Such techniques could be used to efficiently render different objects with different depths.

Texturing has also been widely successful in increasing image complexity without incurring corresponding increase in modeling and rendering costs. Generally speaking, texturing modifies the appearance of each location of a surface using some image, function or other data. As an example, instead of precisely representing the geometry of each brick in a brick wall, a two-dimensional color image of a brick wall can be applied to the surface of a single polygon. When the polygon is viewed, the color image appears where the polygon is located. Because huge savings in modeling, memory and speed are obtained by combining images and surfaces in this way, texturing has become widely accepted and most modern 3D graphics systems use it in some form or other.

Texturing has, for example, been used to create the appearance of different surface depths. One interesting texturing technique is called "bump mapping." Bump mapping makes a surface appear uneven in some manner (for example, bumpy, wrinkled, wavy, rough, etc.). The basic idea behind bump mapping is to modify the surface normals on a surface by accessing a texture. When the surface is lit by a light source, the resulting calculations create the visual appearance of bumps and surface roughness. See, for example, copending commonly assigned application Ser. No. 09/726,218 filed Nov. 28, 2000, entitled "Method And Apparatus For Efficient Generation Of Texture Coordinate Displacements For Implementing Emboss-Style Bump Mapping In A Graphics Rendering System" (Atty. Dkt. 723-960), and its corresponding provisional application, serial No. 60/226,892, filed Aug. 23, 2000; and copending commonly assigned application Ser. No. 09/722,381 filed Nov. 28, 2000, entitled "Method And Apparatus For Environment-Mapped Bump-Mapping In A Graphics System" (Atty. Dkt. 723-962); and its corresponding provisional application, serial No. 60/226,893, filed Aug. 23, 2000; all of which are incorporated herein by this reference.

Although bump mapping techniques can provide convincing illusions of surface complexity, they have the limitation that the underlying surface to which the bump map is applied continues to be the simple (e.g., planar) surface defined by the underlying primitive. Because of this, the illusion of surface complexity breaks down around the silhouettes of objects. At such edges, the viewer notices that there are no real bumps but just smooth outlines. For example, suppose a texture technique such as bump mapping is used to make a smooth sphere appear to be bumpy. Now suppose that sphere is placed within a 3D world so that it occludes a part of other object but you can see a part of the other object. From a hidden surface point of view, the visibility of the edge of the sphere will be absolutely smooth as opposed to bumpy. This is because the texturing effect modifies only the color or alpha of the sphere, and does not modify the characteristics of the sphere from the standpoint of occluding other objects behind it relative to a selected viewpoint. In the real world, if the sphere was actually bumpy, one could see the bumps on the silhouette edge or other intersection point with an object partially behind the sphere.

Shade et al., "Layered Depth Images," *SIGGRAPH 98 Computer Graphics Proceedings, Annual Conference Series*, pages 231–241 (Jul. 19–24, 1998) describes attaching depth information to a 2D image for providing sprites with depth for purposes of scene warping and parallax correction. This paper describes enhancing the realism of sprites by adding an out-of-plane displacement component at each pixel in the sprite. The Shade et al paper describes that sprites with depth can, under certain circumstances, be rendered using texture mapping without z buffering.

While much work has been done in the past, further improvements are possible and desirable.

The present invention provides such improvements by using color texture mapping hardware within a graphics pipeline adapted to texture map sprite depth images ("z" textures") for use in blending with primitive depths. The resulting pixel Z displacement offsets can be depth buffered (e.g., by blending between the z texture and the primitive depth location at each pixel) to provide a range of interesting occlusion-based visualization effects at relatively low cost.

In accordance with one aspect provided by the invention, a method of producing a 3-D image involves applying texture coordinates to a texture mapper and using the texture mapper to access (e.g., resample) a stored z texture map based on the texture coordinates. For example, the texture mapper can apply a non-uniform or non-linear mapping to the stored z texture map. Depth blending is performed based on the accessed stored z texture map (e.g., by blending between the sampled primitive z value and the sampled z texture value) to provide different resulting z values for different pixels of an object. In accordance with this aspect of the invention, a resampled z image is effectively mapped onto a sampled 3D surface. An image is rendered based at least in part on the specified depth buffered data.

In accordance with another aspect provided by this invention, a z blender includes first and second inputs. The first input adapted to receive at least one rasterized depth value corresponding to at least one pixel. The second input is adapted to receive at least one z texel value. Blend logic coupled to the first and second inputs blends the first input with the second input to provide a z blend. Further blend logic adds a bias value to the z blend to provide at least one depth value for use in a hidden surface removal operation.

In accordance with yet another aspect provided by this invention, a graphics pipeline including a texture unit and an embedded z buffer can copy at least a part of the embedded z buffer into a texture memory associated with the texture mapper, and performs a z texture mapping operation based on the copied z texture.

In accordance with yet another aspect provided by this invention, a graphics pipeline including a texture unit having an embedded texture memory and an embedded frame buffer including a color frame buffer and a z buffer allows the embedded texture memory to be configurable to store the z textures in any of a plurality of formats.

In accordance with yet another aspect provided by this invention, a multi-stage texture environment pixel shader includes a plurality of input selectors, a texture environment operator coupled to the plurality of input selectors, and at least one intermediate value storage register. A z blender is adapted to blend, in at least one stage of the multi-stage texture environment unit, z texel values with primitive surface z values to provide blended z values for occlusion testing.

Additional features provided by this invention include:
common texture mapping hardware is used for color/alpha texturing and for z texturing for sprites with depth or other applications.

z blender performs a z blending operation in eye or screen space to blend surface z values with z texel values z texels can represent absolute depths or depth displacements relative to depth of a primitive surface z texel values may add to or replace primitive surface z values a constant bias may be added to the z blend if desired the resulting depth values are used for occlusion testing z textures can be generated by copying out portions of an embedded z buffer and providing the copied depth value to the texture mapping hardware multiple z texel formats are supported.

BRIEF DESCRIPTION OF THE DRAWINGS

These and other features and advantages provided by the invention will be better and more completely understood by referring to the following detailed description of presently preferred embodiments in conjunction with the drawings. The file of this patent contains at least one drawing executed in color. Copies of this patent with color drawing(s) will be provided by the Patent and Trademark Office upon request and payment of the necessary fee. The drawings are briefly described as follows:

FIG. 5 is an example logical flow diagram of the FIG. 4 graphics and audio processor;

FIG. 6 is a block diagram of an example z texturing technique;

FIG. 7A shows an example color texture;

FIG. 7B shows an example z texture;

FIG. 8 is a block diagram of an example z texture blending operation;

FIGS. 9A–9C show example z texel formats;

FIG. 10 is a block diagram of an example texture environment unit used for z blending in the example embodiment;

FIG. 11 is a block diagram of example texture environment unit z blend logic;

FIG. 12 shows example z texture control registers:

FIG. 13 shows example z texture sourcing in the example embodiment;

DETAILED DESCRIPTION OF EXAMPLE EMBODIMENTS OF THE INVENTION

Figure 1:
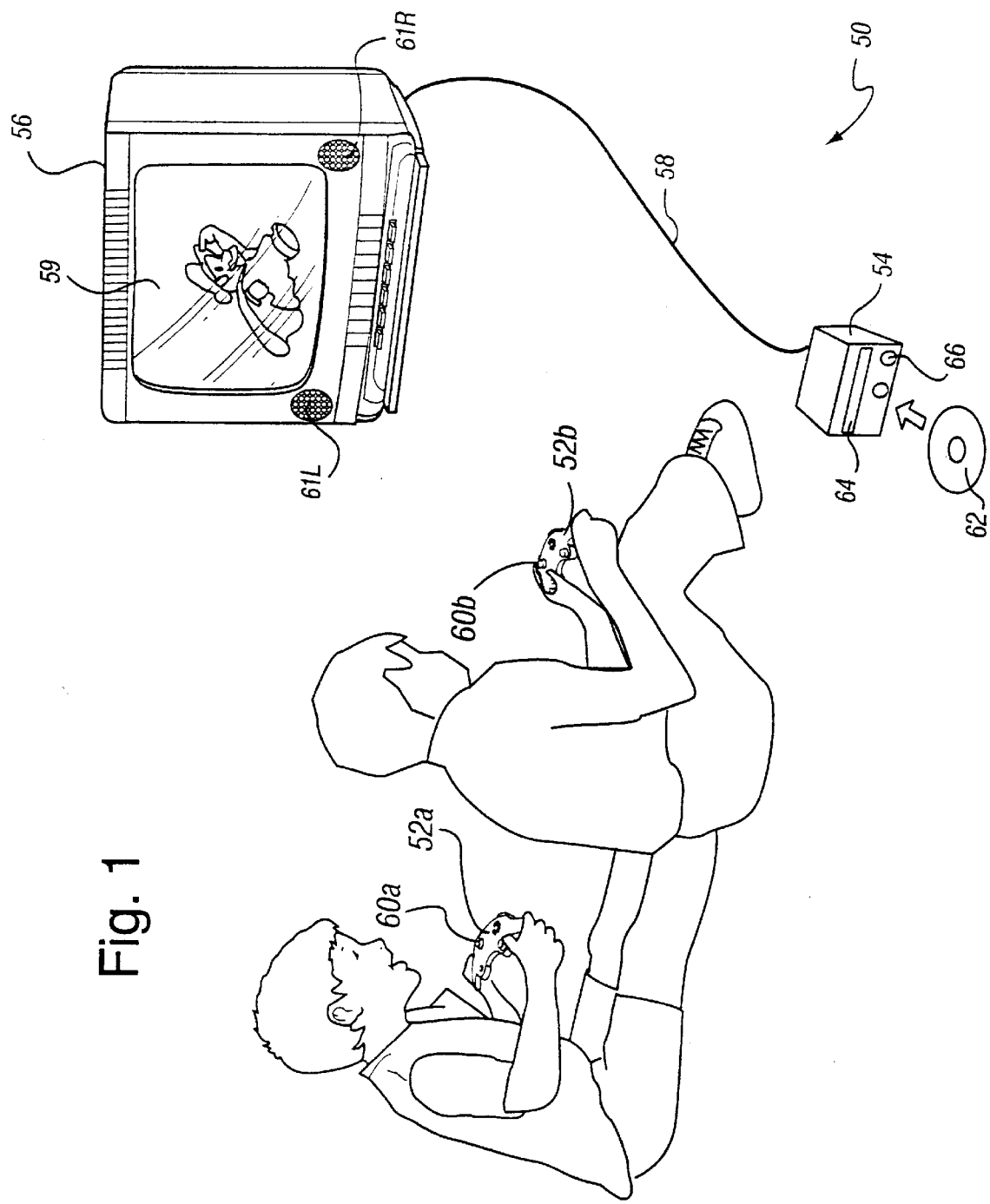
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used t create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
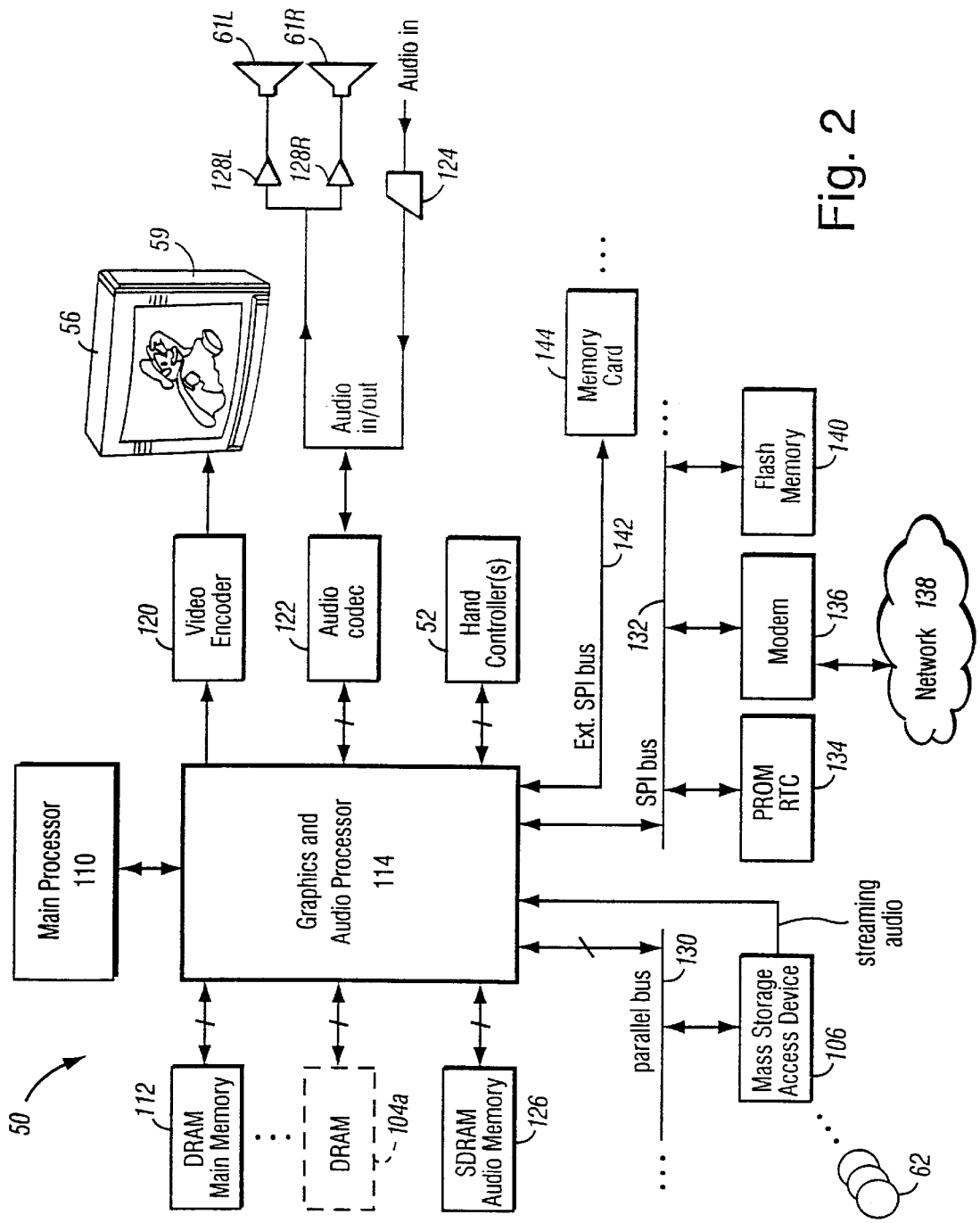
FIG. 2 is a block diagram of the FIG. 1 example computer graphics system.

FIG. 2 shows a block diagram of example components of system 50. The primary components include:
- a main processor (CPU) 110,
- a main memory 112, and
- a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
- a programmable read-only memory and/or real time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
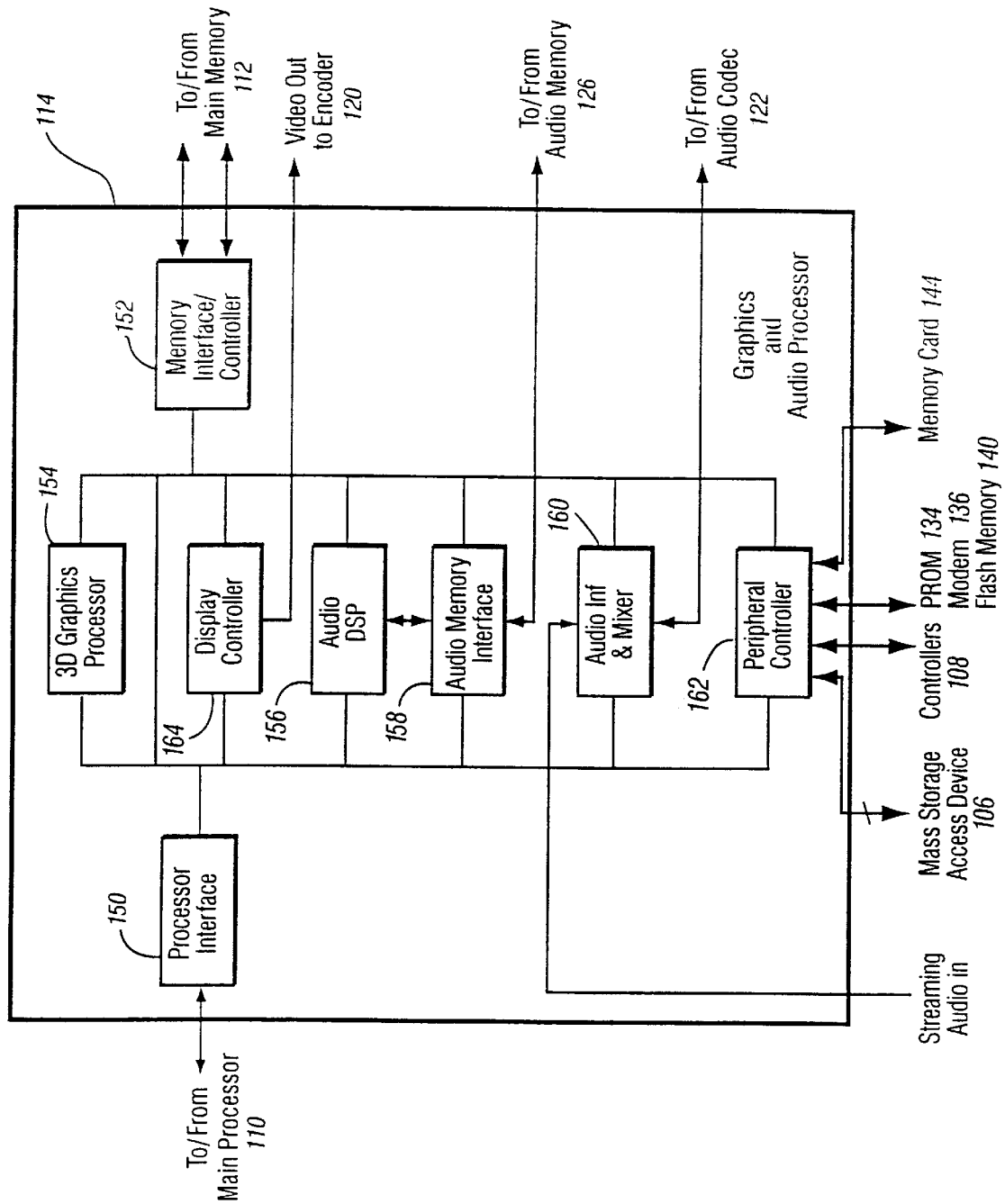
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
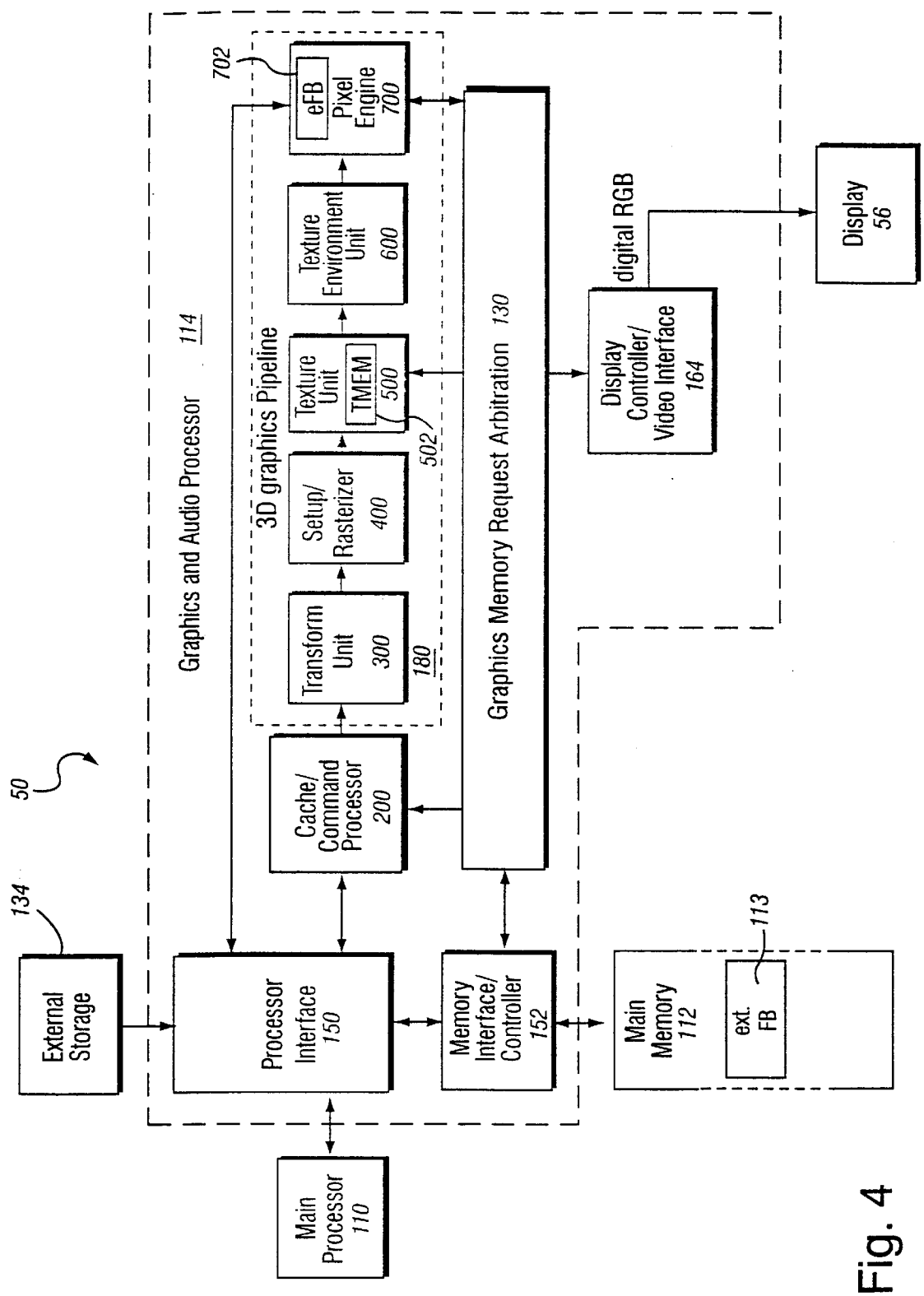
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transforms and other operations 300a (see FIG. 5). Transform unit 300 may include one or more matrix memories 300b for storing matrices used in transformation processing 300a. Transform unit 300 transforms incoming geometry per vertex from object or model space to homogenous eye space using a Modelview Matrix, and (after clipping 300d in clip space if desired) performs perspective scaling and screen coordinate conversion to provide resulting screen space (x, y, z) triplets for rasterization. Transform unit 300 also transforms incoming texture coordinates and computes projective texture coordinates (300c). Lighting processing 300e also performed by transform unit 300b provides per vertex lighting computations for up to eight independent lights in one example embodiment. Transform unit 300 can also perform texture coordinate generation (300c) for embossed type bump mapping effects.

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip embedded DRAM texture memory (TMEM) 502) performs various tasks related to texturing including for example:

retrieving color and z textures 504 from main memory 112, texture processing (500a) including, for example, multi-texture handling, post-cache texture decompression, texture filtering (e.g., resampling to provide non-uniform and/or non-linear texture mapping), embossing, shadows and lighting through the use of projective textures, and BLIT with alpha trans parency and depth, bump map processing for computing texture coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending. Briefly, texture environment unit 600 in the example embodiment combines per-vertex lighting, textures and constant colors to form the pixel color and then performs fogging and blending including z blending for z textures. In the example embodiment, the color and alpha components have independent texture environment unit circuitry with independent controls. One set of texture environment color/alpha-combiners implemented in hardware can be reused over multiple cycles called texture environment stages (each having independent controls) to implement multi-texturing or other blending functions. The preferred example embodiment supports up to sixteen texture environment stages, although other embodiments could support different numbers of stages.

In this example, pixel engine 700 stores color and depth data into an embedded (on-chip) DRAM (1TSRAM) frame buffer memory 702 including a color frame buffer and a depth buffer. Pixel engine 700 performs depth (z) compare (700a) and pixel blending (700b). Z compares 700a' can also be performed at an earlier stage in the graphics pipeline 180. (i.e., before texturing) depending on the rendering mode currently in effect (e.g., if alpha thresholding is not required). However, for z texturing in the example embodiment, it is desirable to provide z buffering at the end of the pipeline. The pixel engine 700 includes a copy operation 700c that periodically writes on-chip frame buffer 702 to main memory 112 for access by display/video interface unit 164. This copy operation 700c can also be used to copy embedded frame buffer color or z information to textures in the main memory 112 for dynamic color or z texture synthesis. Anti-aliasing and other filtering can be performed during the copy-out operation. The color frame buffer output of graphics pipeline 180 (which is ultimately stored in main memory 112) is read each frame by display/video interface unit 164. Display controller/video interface 164 provides digital RGB pixel values for display on display 102.

Example Z Texturing

The example graphics pipeline 180 supports combining a color texture and a depth ("z") texture to facilitate image-based rendering in which the frame buffer 702 is a composite of smaller color and depth images, like sprites with depth. While the technique provided by this invention is not limited to image generation using color textures with corresponding depth textures, such sprites with depth are is particularly useful to provide increased visualization color and occlusion complexity in video games and other interactive applications at relatively low cost.

FIG. 6 shows an example z texturing operation using a color texture $t_c$ and a z texture $t_z$, to form a sprite with depth. In this context, a sprite may be regarded as a texture map or image with or without alpha (transparency) rendered onto a planar surface. The corresponding z texture $t_z$ provides a z displacement or an absolute depth for each image element (texel) in the texture map or image—which z displacements can be different for each different image element. In the FIG. 6 simplified diagram, texture coordinate generation 500(1) performed by transform unit 300 generates texture coordinates used to look up and map color texture $t_c$. The resulting color texels (which may be filtered using standard texture filtering techniques) are blended or otherwise applied to a primitive surface by texture environment unit 600. The resulting pixels are stored in an embedded color frame buffer 702c for imaging and/or further processing.

In this example embodiment, texture coordinate generation 500(1) also generates texture coordinates for use in z texture mapping/resampling. Texture memory 502 can store z texture $t_z$ in a variety of different formats, and texture unit 500 can look up and map z texture $t_z$ using the same or different texture coordinates used for color texture mapping (e.g., using a non-linear or non-uniform mapping). The resulting z texels output by texture unit 500 are applied to a z blender 600z. Z blender 600z blends the z texel depth values with the depth of the surface the z texture is being mapped onto or replaces the surface depth with the z texel depth values. The pixel depth values resulting from the z blending operation are applied to a hidden surface removal operation using z compare 700a (see FIG. 5) operating in conjunction with an embedded z buffer 702z. The hidden surface removal operation in conjunction with the z buffer allows the z texture $t_z$ to control whether parts of the texture mapped image are occluded by other objects in the scene.

FIG. 7A shows an example color texture $t_c$, for a sprite with depth and FIG. 7B shows an example corresponding z texture $t_z$ for the sprite with depth. The color texture $t_c$ in FIG. 7A provides a two-dimensional image of a bush. Example z texture $t_z$ of FIG. 7B provides a two-dimensional absolute or displacement map of this same bush. In FIG. 7B, for example, $z_1$ corresponding to the depth (displacement) $z_1$ of a front part of the bush can be defined having a z value that is closer to the selected viewpoint than depth (displacement) values $z_2$, $z_3$, $z_4$, $z_5$, $z_6$ corresponding to rearward portions of the bush. Using this auxiliary z texture depth information, it becomes possible for other objects in the scene to occlude parts of the FIG. 7A color image of the bush while being occluded by other parts of this color texture image. For example, a bird defined at a depth position between $z_2$ and $z_3$ could appear to "fly through" the bush. The front portions of the bush $z_1$, $z_2$ could occlude the bird as it passes "behind" those portions of the bush. In contrast, the bird could occlude portions $z_3$, $z_4$, $z_5$, $z_6$ of the bush as it flies "in front of" those portions of the bush. Hence, a substantial degree of occlusion complexity can be realized at low cost using mechanisms in system 50 shared with color texturing operations. While the FIG. 7B example z texture shows depth encoding by region, this is accomplished in the example embodiment by storing a different depth (displacement) value in each of the various z texel locations of the z texture to provide arbitrarily complex occlusion visualization.

Example Z Texture Blend Operation

FIG. 8 schematically illustrates an example z texture blend operation 600z. In the FIG. 8 example, a primitive surface z value is provided to texture blend operation 600z in the form of a reference depth $z_0$ at the center of a pixel quad. The example embodiment of system 50 computes the depth (z) for a quad (2×2) of pixels as a reference $z_0$ and two slopes $z_x$ and $z_y$. Note that in the example embodiment, these values have already been transformed by transform unit 300 from object (world) space to screen space based on the selected viewpoint (e.g., the camera position in world space). In the example embodiment, the reference $z_0$ and slopes $z_x$ and $z_y$ define a plane equation that specifies the depth plane of the primitive surface.

When z texturing is enabled in the example embodiment, the slope values $z_x$, $z_y$ are ignored. Four z texels are presented to texture blend operation 600z as a result of texture mapping for each of the four pixels of the pixel quad. Texture blend operation 600z computes the z of each pixel in the quad by blending the primitive reference depth $z_0$ and the depth of an appropriate one of the four z texels that has been mapped to the pixel location by texture unit 500. While pixels are parallel processed in quads in the example embodiment, other embodiments could process pixels individually, in pairs, in threes, in octets, or in any other convenient way.

In this example, the blending is accomplished by selectively either adding a (texture mapped) z texel value to the reference z (in which-case the z texel represents a depth displacement) or by replacing the reference z with the (texture mapped) z texel value (in which case the z texel represents an absolute depth value). This accomplishes a blending/mapping between the resampled z image (texture) and a sampled 3D surface such that the z texture potentially provides a different primitive depth value/offset for each pixel. In the example embodiment, the application programmer specifies which of these two operations (add or replace) should be performed through specification of the state of an replace/add control 652. In the example embodiment, the pixel z values are presented to one input of a respective adder 650. Another input of each of adders 650 receives either the reference depth $z_0$ or the value of 0—depending on the state of the replace/add control 652. An additional set of adders 654 is provided within example texture blend operation 600z adds an optional bias value 656 to the sum outputted by adders 650. Thus, when z texture is enabled in this example, the z texels will offset or replace the reference z (i.e., the z slopes will not be added), and a constant bias can be added to the result.

In the particular example shown, the texture adders 650, 654 do not clamp in the preferred embodiment, so the application programmer must make sure there is no overflow. However, clamping or other overflow control could be provided in other embodiments. Blending operations other than add or replace could be provided if desired. While cascaded adders 650, 654 are used in the example embodiment, other configurations (e.g., a three-input adder) could be used to provide a blending or other combining or calculating function.

Z texture blend operation 600z provides the resulting computed blended z values $z_0$, $z_1$, $z_2$ and $z_3$ (providing depth information for each of the four pixels in the quad) to depth buffer compare logic for hidden surface removal processing. If z buffering is enabled, the resulting pixel z values are compared with the current z values for the pixels stored in the embedded z buffer 702z. Graphics pipeline 180 should be configured to perform hidden surface removal after texture lookup when using z textures, since otherwise, hidden surface removal performed before z, texturing will not take into account the z values developed by z blend operation 600z.

In the example implementation, transform unit 300 uses a Model View Matrix to transform incoming vertices from world (object) space to screen space, and rasterization and texturing is performed in screen space as opposed to world (object) space. Since z blending 600 is performed as part of the rasterizing pipeline in the example embodiment, z texturing is also performed in screen space. Blending the z values in screen or eye space as opposed to world (object) space reduces the hardware costs, but there is a tradeoff. Because screen space is a non-linear coordinate space, a particular $\Delta z$ in screen space represents different depths depending on the z it is applied to. The same can be said for eye space. In other words, in such coordinate systems, a particular $\Delta z$ can represent different differential depths depending upon on how close or far away the corresponding surface is from the selected viewpoint. This limitation may not represent a significant limitation in video games because the video game programmer can usually constrain and control the approximate distance from the viewpoint that a particular surface will appear. However, in other applications (e.g., flight simulators), the non-linear nature of a z blending operation in screen or eye space might require a correction (e.g., perspective correction of the z offset and/or interpolation based on world space). In the example embodiment, the application programmer can define z texels as absolute depth values to get around this issue.

Example Z Texel Formats

In the example embodiment, z texture blend operation 600z can accept a variety of z texel formats. Example z texel formats are shown in FIGS. 9A–9C. The FIG. 9A example z texel format provides an unsigned 8-bit value. The FIG. 9B example z texel format provides an unsigned 16-bit value. The FIG. 9C example z texel format provides an unsigned 24-bit value. The example texture blend operation 600z converts the FIG. 9A and FIG. 9B texel format values to 24-bit values by right-justifying them (i.e., placing the texel value in the least significant bit position and inserting leading zeros in the most significant bit(s). In the example embodiment, adders 650, 654 comprise 24-bit adders, and bias value 656 may be a 24-bit constant bias. An additional conversion at the output of texture blend operation 600z may be provided to convert the 24-bit results to 16-bit z format (or other format) before comparing with the z values stored in embedded z buffer 702z.

In the example embodiment, the various z texel formats shown in FIGS. 9A, 9A, 9C are compatible with corresponding color texel formats. For example, the 8-bit z texel format shown in FIG. 9A appears, to the texture hardware, as being identical to an I8 color (intensity) texel format. Similarly, the 16-bit z texel format shown in FIG. 9B appears to be identical, from the standpoint of the texture hardware, to an IA8 color(intensity)/alpha texel format; and the 24-bit z texel format shown in FIG. 9C appears to be identical from the standpoint of the texture hardware, to an RGBA8 color texel format. Such compatibility between color and z texel formats allows the same example embodiment texture hardware used for looking up and mapping color textures Tc also to be used to look up and map z textures Tz. Since texture unit 500 in the example embodiment is recirculating and can iteratively perform multiple texture lookups for a given primitive fragment, z texturing can be performed in the preferred embodiment using the same texture hardware used for color texturing operations. This provides significant savings in terms of chip real estate while allowing z texturing to be performed by graphics pipeline 180 at hardware speeds.

Texture Environment Unit Z Texture Blending

In the example embodiment, the FIG. 8 z texture blending operation 600z is performed as part of the last stage of texture environment unit 600. FIG. 10 shows an example block diagram of texture environment unit 600. This component is described in more detail in commonly-assigned copending application Ser. No. 09/722,367 entitled "Recirculating Shade Tree Blender For a Graphics System" (attorney docket 723-968), and its corresponding provisional application, serial No. 60/226,888, filed Aug. 23, 2000, both of which are incorporated herein by this reference. In this example, rasterized color is applied to a series of stage select inputs 656. A texture environment operation 658 is performed on this selected set of inputs to provide an output. A texture environment operation 658 can be selected from any of a number of different operations including, for example:

modulate, modulate 2x, modulate 4x;
add;
add signed, add signed 2x:
subtract;
add smooth;
blend diffuse alpha, blend texture alpha, blend factor alpha, blend current alpha;
blend texture alpha pre-multiplied;
modulate alpha and add color;
modulate color and add alpha;
modulate inverse alpha and add color;

modulate inverse color and add alpha;

specular color and texture:

embossing;

detailed texture;

other operation(s).

A set of four input/output registers 660 are provided to store temporary results, pass results from one stage to the next, or supply user-defined constant colors. These color registers 660 are shared among all texture environment stages. The last stage sends its output to the "GX_Tevprev" register 660(4) in this example embodiment. The alpha produced by the last texture environment stage is input to an alpha-compare operator 662. The result of the alpha compare can be used to conditionally mask color (and also z if desired) writes to the frame buffer. Fog, if enabled, is applied to the pixel values output from the last texture environment stage.

In the example embodiment, the z blending operation 600z described above is performed as part of the last stage of texture environment unit 600. Color is also output from the last texture environment unit 600 stage when z textures are enabled, but the texture input of the last stage of the example embodiment is occupied by the z texture so it cannot be used as a color source. Accordingly, in this example embodiment, it is not possible to apply further texture environment operations to the z texture. However, other embodiments may not have this restriction and could provide an additional stage(s) of texture environment recirculation if desired. Even when z texturing is enabled, all other color inputs and all texture environment operations of the last stage can be used. The alpha side of the texture environment stage is not affected by the z textures in this embodiment and therefore can remain active and functional (e.g., to provide color texture transparency).

FIG. 11 shows an example texture environment fog calculation unit including an example embodiment of a z texture blend hardware implementation. In this example, the rasterized z values developed by a texture rasterizer are presented to a z blend circuit 600z'. The z texture values provided through a texture mapping function by texture unit 500 are presented to z blend circuit 600z' (e.g., over the same bus used to provide texture color to texture environment unit 600). Z blend circuit 600z' may comprise the z texture blend components shown in FIG. 8 and discussed above. The four resulting z values (one for each pixel of a quad) are presented to a z offset circuit 602 that computes, in screen space, the value of the z at the center of the current quad returned by using the coverage of pixels within the quad. The screen-to-eye space z conversion block 604 converts z from screen space to eye space for purposes of a fog computation (if any), and can also multiply the result by a constant related to the required fog density (if any). The dotted line path shows an alternate method of performing this operation in the case of an orthographic projection. The remaining circuitry shown in FIG. 11 is used to apply various fog functions. See copending commonly assigned U.S. patent application Ser. No. 09/726,225 filed Nov. 28, 2000 entitled "Method and Apparatus For Providing Improved Fog Effects In a Graphics System" (Atty. Dkt. 723-954); and its corresponding provisional application, serial No. 60/227,032, filed Aug. 23, 2000, both of which are incorporated herein by this reference.

Example Z Texturing Control Registers

FIG. 12 shows example texture environment z texture control registers used to control the texture environment unit 600 to perform z texturing. In this example, the register 690 specifies the z bias 656 used in z blending 600z. Register 692 includes a "z_type" field that selects z texel type (e.g., u8.0, u16.0, u24.0) and a "z_op" field that specifies the type of z operation (e.g., disable, add or replace).

Example Z Texture Sourcing

Figure 14:
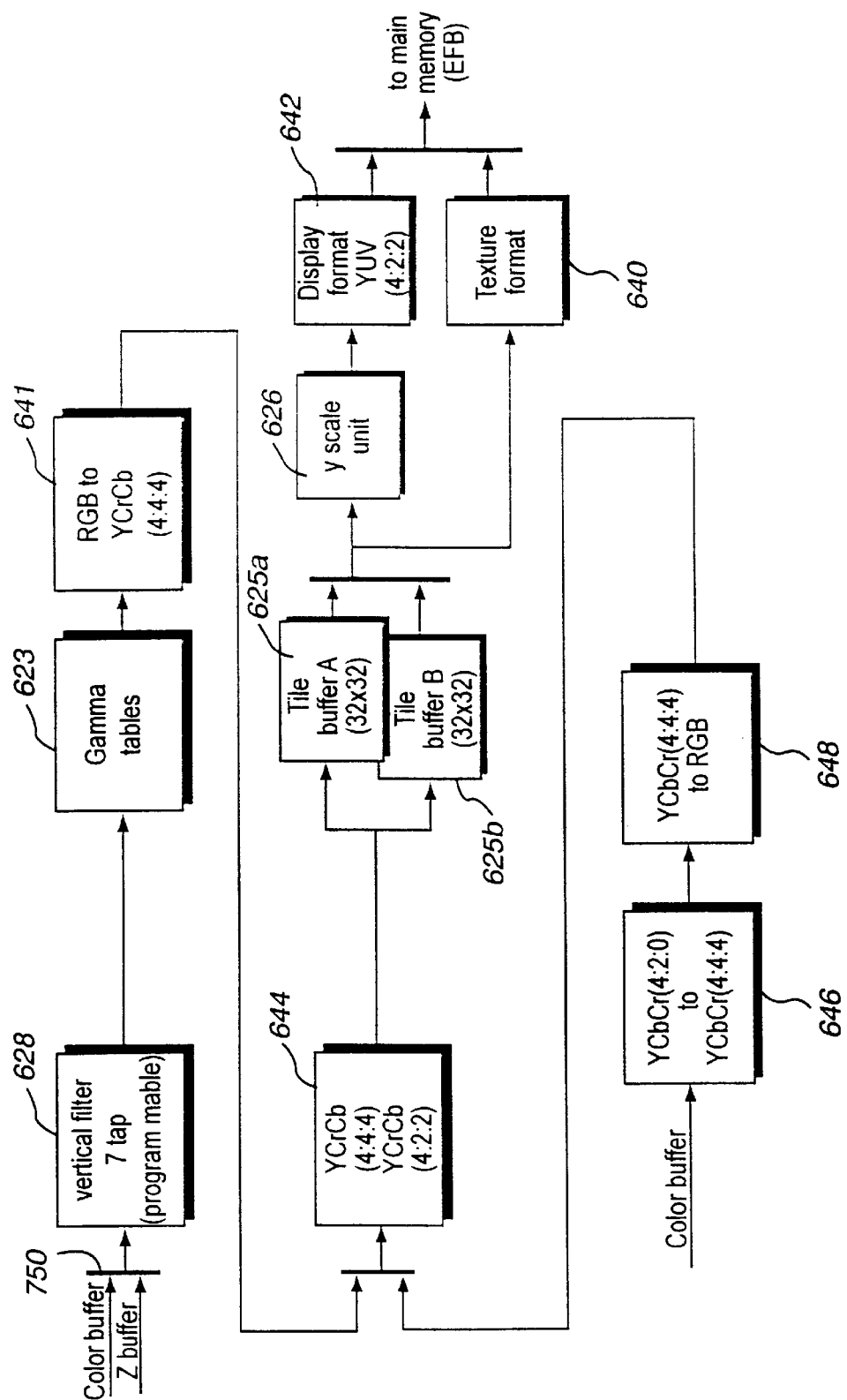
FIG. 14 shows an example copy out pipeline.

FIG. 13 shows example sources for z textures $T_Z$ in the example embodiment. Precomputed $Z_T$ textures can be supplied via mass storage such as optical disk and stored in main memory 112, or they can be computed by main processor 110. In addition, in the example embodiment, z textures can be copied from the embedded z buffer 702z during a copy-out operation from embedded frame buffer 702 to main memory 112—allowing graphics pipeline 180 to dynamically create z textures. In more detail, the example pixel engine 700 copy-out pipeline shown in FIG. 14 includes a multiplexer 750 that selects between the color frame buffer 702c and the z buffer 702z. When the z buffer 702z is selected by multiplexer 750, the example copy-out pipeline can copy out a tile from z buffer 702z into main memory 112 which can then be read into texture memory 502 for use as a z texture Tz. For example, the z buffer 702z can be set to a 24-bit z format which can then be copied into the z texel format shown in FIG. 9C (equivalent format to RGBA8 color texel). In the preferred embodiment, a copy-out pipeline does not provide copy-out to the 8-bit or 16-bit z texel format shown in FIGS. 9A and 9B, nor does it provide a copy-out operation when the embedded frame buffer is operated in a super-sampled mode. Alternative implementations could be provided to avoid these particular restrictions.

Example API Calls

The following are example API calls the example system 50 may use to invoke the z texturing functions and operations discussed above.:

GXSetZTExture

Description

This function controls Z texture operations. Z textures can be used to implement image-based rendering algorithms. A composite image consisting of color and depth image planes can be merged into the Embedded Frame Buffer (EFB).

Normally, the Z for a quad (2×2) of pixels is computed as a reference Z and two slopes. Once Z texturing is enabled, the Z is computed by adding a Z texel to the reference Z (op=GX_ZT_ADD) or by replacing the reference Z with the Z texel value (op=GX_ZT_REPLACE).

Z textures are output from the last active Texture Environment (TEV) stage (see GXSetTevStages) when enabled. When Z texturing is enabled, the texture color of the last TEV stage is not available, but all other color inputs and operations are available. The pixel color is output from the last active TEV stage. In the example embodiment, the Z texture, is fed directly into the Z texture logic and cannot be operated on again by the texture environment unit 600.

Example Z texel formats can be unsigned 8-bit (GX_TF_Z8), 16-bit (GX_TF_Z16), or 24-bit (GX_TF_Z24X8 (32-bit texture)) formats. The Graphics Processor converts the Z-textures to 24-bit values by placing the texel value in the least-significant bits and inserting zero's in the remaining most-significant bits. The 24-bit constant bias is added to the Z texture. If the pixel format is GX_PF_RGB565_Z16 the 24-bit result is converted to the current 16-bit Z format before comparing with the EFB's Z.

The Z-texture calculation is done before the fog range calculation in the example embodiment.

GXInit disables Z texturing.

Arguments

| | |
|---|---|
| op | Specifies Z texturing operation. |
| fmt | Format for Z texture. |
| Bias | Bias. Format is u24, right justified |

Example Usage:

```
void GXSetZTexture (
    GXZTexOp   op,
    GXTexFmt   fmt,
    u32        bias );
```

GXZTexOp
  Enumerated Values
  GX_ZT_DISABLE
  GX_ZT_ADD
  GZ_ZT_REPLACE
  GX_MAX_ZTEXOP These commands write to the FIG. 12 example texture control registers described above.

GXTexFmt

The example embodiment supports the following example color and z texel formats:

Enumerated Values
  GX_TF_I4
  GX_TF_I8
  GX_TF_A8
  GX_TF_IA4
  GX_TF_IA8
  GX_TF_RGB565
  GX_TF_RGB5A3
  GX_TF_RGBA8
  GX_TF_CMPR
  GX_TF_Z8 (z texture)
  GX_TF_Z16 (z texture)
  GX_TF_Z24X8 (z texture)

GXInit
  Description

This function sets the default state of the graphics processor. It is generally called before any other GX functions. GXInit sets up an immediate-mode method of communicating graphics commands from the CPU to the Graphics Processor (GP). One of the parameters that can be specified is to enable/disable z texturing.

The "default" is for z texturing to be disabled.

The following code fragment describes some relevant default state settings after calling GXInit:

```
//
// Texture
//
GXInvalidateTexAll( );
// allocate 8 32k caches for RGBA texture mipmaps
// equal size caches to support 32b RCBA textures
// ... code not shown ...
// allocate color index caches in low bank of TMEM
// each cache is 32kB.
// even and odd regions should be allocated on different address.
// ... code not shown ...
// allocate TLUTs, 16 256-entry TLUTs and 4 1K-entry TLUTs.
// 256-entry TLUTs are 8kB, 1k-entry TLUTs are 32kB.
// ... code not shown
//
// Set texture region and tlut region callbacks
//
GXSetTexRegionCallBack(_GXDefaultTeXRegionCallBack);
GXSetTlutRegionCallBack(_GXDefaultTlutRegionCallBack);
//
// Texture Environment
//
GXSetTevOrder(GX_TEVSTAGE0, GX_TEXCOORD0, GX_TEXMAP0, GX_COLOR0A0);
GXSetTevOrder(GX_TEVSTAGE1, GX_TEXCOORD1, GX_TEXMAP1, GX_COLOR0A0);
GXSetTevOrder(GX_TEVSTAGE2, GX_TEXCOORD2, GX_TEXMAP2, GX_COLOR0A0);
GXSetTevOrder(GX_TEVSTAGE3, GX_TEXCOORD3, GX_TEXMAP3, GX_COLOR0A0);
GXSetTevOrder(GX_TEVSTAGE4, GX_TEXCOORD4, GX_TEXMAP4, GX_COLOR0A0);
GXSetTevOrder(GX_TEVSTAGE5, GX_TEXCOORD5, GX_TEXMAP5, GX_COLOR0A0);
GXSetTevOrder(GX_TEVSTAGE6, GX_TEXCOORD6, GX_TEXMAP6, GX_COLOR0A0);
GXSetTevOrder(GX_TEVSTAGE7, GX_TEXCOORD7, GX_TEXMAP7, GX_COLOR0A0);
GXSetTevOrder(GX_TEVSTAGE8, GX_TEXCOORD_NULL, GX_TEXMAP_NULL,
    GX_COLOR_NULL);
GXSetTevOrder(GX_TEVSTAGE9, GX_TEXCOORD_NULL, GX_TEXMAP_NULL,
    GX_COLOR_NULL;
GXSetTevOrder(GX_TEVSTAGE10, GX_TEXCOORD_NULL, GX_TEXMAP_NULL,
    GX_COLOR_NULL);
GXSetTevOrder(GX_TEVSTAGE11, GX_TEXCOORD_NULL, GX_TEXMAP_NULL,
    GX_COLOR_NULL);
GXSetTevOrder(GX_TEVSTAGE12, GX_TEXCOORD_NULL, GX_TEXMAP_NULL,
    GX_COLOR_NULL);
GXSetTevOrder(GX_TEVSTAGE13, GX_TEXCOORD_NULL, GX_TEXMAP_NULL,
    GX_COLOR_NULL);
```

-continued

```
GXSetTevOrder(GX_TEVSTAGE14, GX_TEXCOORD_NULL, GX_TEXMAP_NULL,
GX_COLOR_NULL);
GXSetTevOrder(GX_TEVSTAGE15, GX_TEXCOORD_NULL, GX_TEXMAP_NULL,
GX_COLOR_NULL);
GXSetNumTevStages(1);
GXSetTevOp(GX_TEVSTAGE0, GX_REPLACE);
GXSetAlphaCompare(GX_ALWAYS, 0, GX_AOP_AND, GX_ALWAYS, 0);
GXSetZTexture(GX_ZT_DISABLE, GX_TF_Z8, 0);
```

To activate z texturing in the example embodiment. GXInit should be called with "GXSetZtexture" including a "GX_ZT_Enable" parameter and an appropriate z texture format specifier.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 15A:
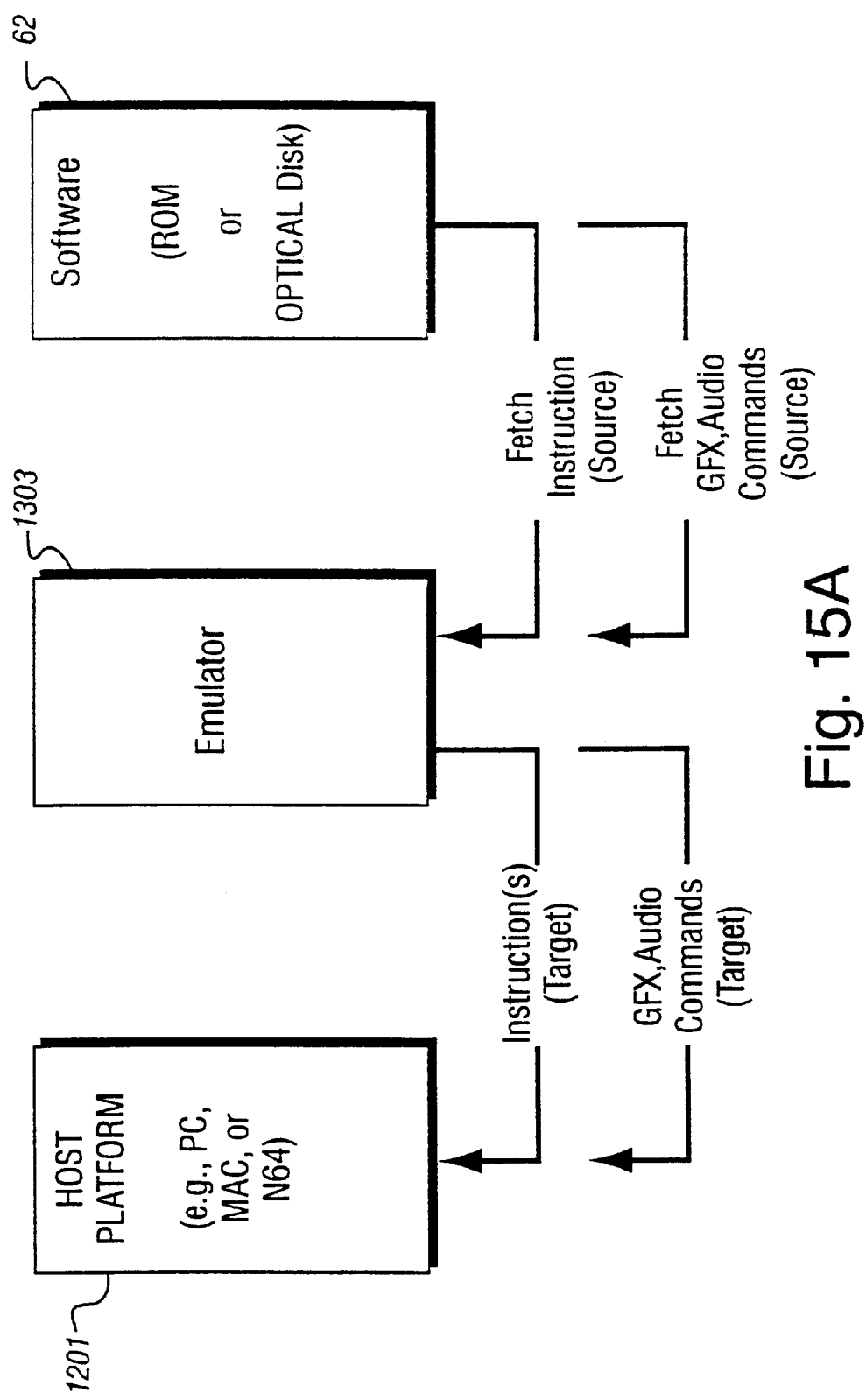
FIGS. 15A and 15B show example alternative compatible implementations.

FIG. 15A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1305 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

If the graphics hardware on the emulator platform does not support z texturing, then z texturing will need to be emulated in software or the feature will not be supported at all. If the z texturing operation is "stubbed" (i.e., ignored), then the emulator may provide anomalous image results that do not match exactly the imaging results of the native platform. Z texturing could be emulated using a variety of different methods (e.g., software emulation routines acting on an external z buffer in main memory).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 15B:
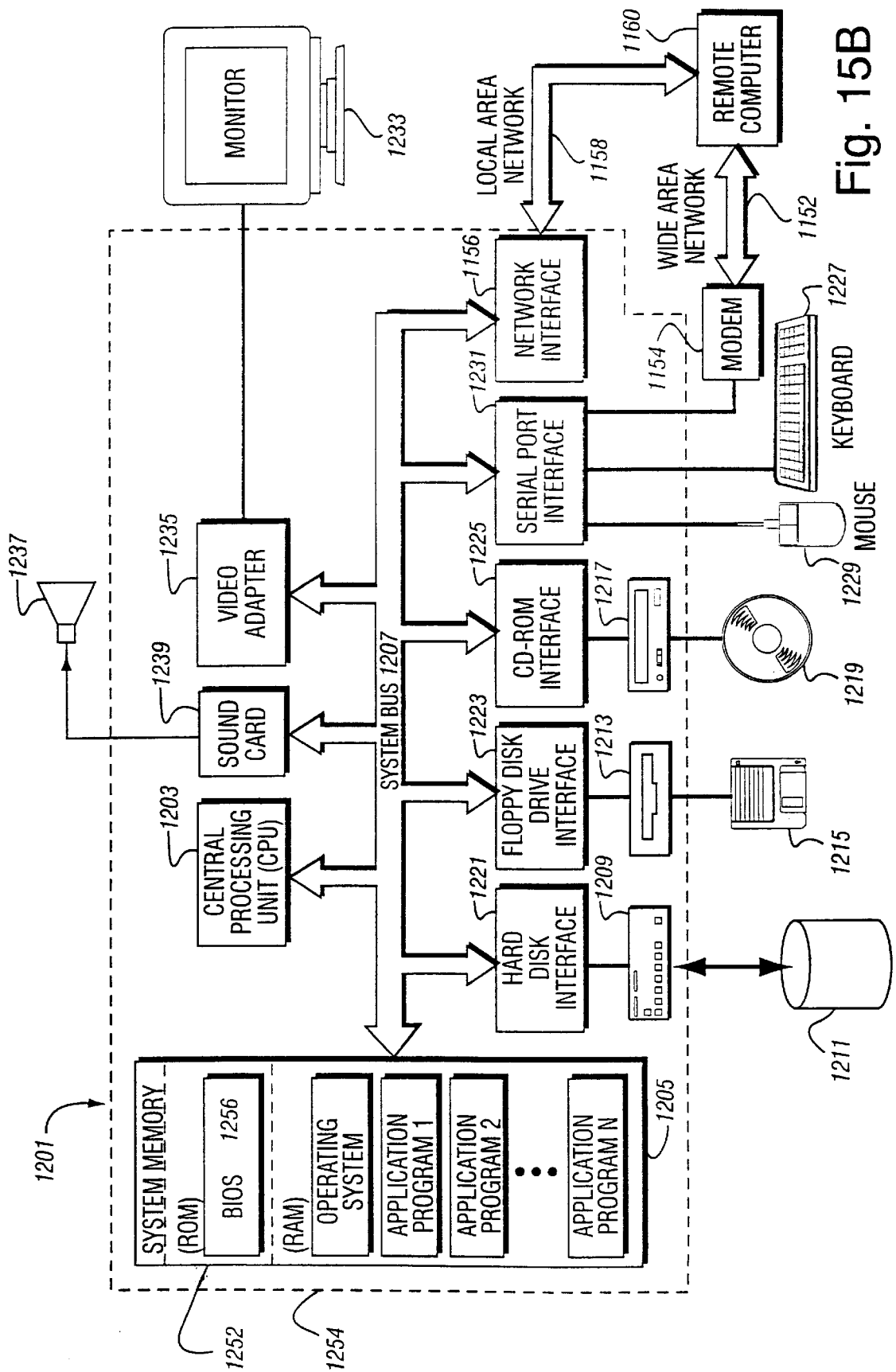

FIG. 15B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A method of producing a 3D image comprising:
   (a) applying texture coordinates to a texture mapper;
   (b) using the texture mapper to resample a stored z texture map based on the texture coordinates;
   (c) performing a depth blending in screen or eye space based at least in part on the accessed stored z texture map to specify data for depth buffering; and
   (d) rendering an image based at least in pan on the depth buffered data.

2. The method of claim 1 wherein the performing step comprises replacing per pixel depth values with z texel absolute depth values.

3. The method of claim 1 wherein the performing step comprises using the accessed stored z texture map values as displacements to offset per pixel primitive z values.

4. The method of claim 1 wherein the stored z texture map comprises z texels having any one of plural z texel formats compatible with corresponding color texel formats.

5. The method of claim 1 further including rendering the z texture map into a depth buffer, and then copying the rendered z texture map from the depth buffer to the texture mapper.

6. The method of claim 1 further including using z texel values to selectively offset or replace rasterized z values corresponding to a surface.

7. The method of claim 1 wherein the texture mapper performs color and z texture mapping in different passes using common multipass texture mapping hardware.

8. A method of producing a 3D image comprising:
   (a) applying texture coordinates to a texture mapper;
   (b) using the texture mapper to resample a stored z texture map based on the texture coordinates;
   (c) performing a depth blending in screen or eye space based at least in part on the accessed stored z texture map to specify data for depth buffering;
   (d) rendering an image based at least in part on the depth buffered data; and
   (e) further including adding a bias value to a screen space blend of z texel values and rasterized surface z values.

9. The method of claim 1 wherein the depth blending performing step uses said z texture to remove hidden surfaces.

10. A z blender comprising:
    a first input adapted to receive at least one rasterized depth value corresponding to a pixel;
    a second input adapted to receive at least one z texel value;
    blend logic coupled to the first and second inputs, said blend logic blending the first input with the second input to provide a z blend for said pixel; and
    further blend logic that adds a bias value to the z blend and provides at least one depth value for use in a hidden surface removal operation.

11. In a graphics pipeline including a texture mapper and an embedded z buffer, a method of performing z texturing comprising:
    copying out at least a part of the embedded z buffer into a texture memory associated with the texture mapper; and performing a z texture mapping operation based on the copied z texture.

12. A graphics chip including:

a graphics pipeline including a texture unit having an embedded texture memory, and an embedded frame buffer including a color frame buffer and a z buffer, wherein said embedded texture memory is configurable to store the z textures in any of a plurality of different formats.

13. A graphics chip including:

a graphics pipeline including a texture unit having an embedded texture memory, and an embedded frame buffer including a color frame buffer and a z buffer, wherein said embedded texture memory is configurable to store the z textures in any of a plurality of different formats, wherein said embedded texture memory is configurable to store z texels in any of unsigned 8-bit, unsigned 16-bit or unsigned 24-bit formats.

14. The apparatus of claim 12 wherein said embedded texture memory stores z texels in formats compatible with color texels, and is shared between color texturing and z texturing.

15. The apparatus of claim 12 further including a z blender tat blends z texel values with primitive surface z values by performing at least one depth blending operation in screen space.

16. In a graphics pipeline, a multi-stage texture environment pixel shader comprising:

a plurality of input selectors;

a texture environment operator coupled to the plurality of input selectors;

at least one intermediate value storage register; and a z blender adapted to blend, in at least one stage, resampled z texel values with per-pixel primitive surface z values to provide blended z values for occlusion testing.

17. The graphics pipeline of claim 16 wherein the z blender blends within a last pixel shader stage.

* * * * *